UNITED STATES PATENT OFFICE.

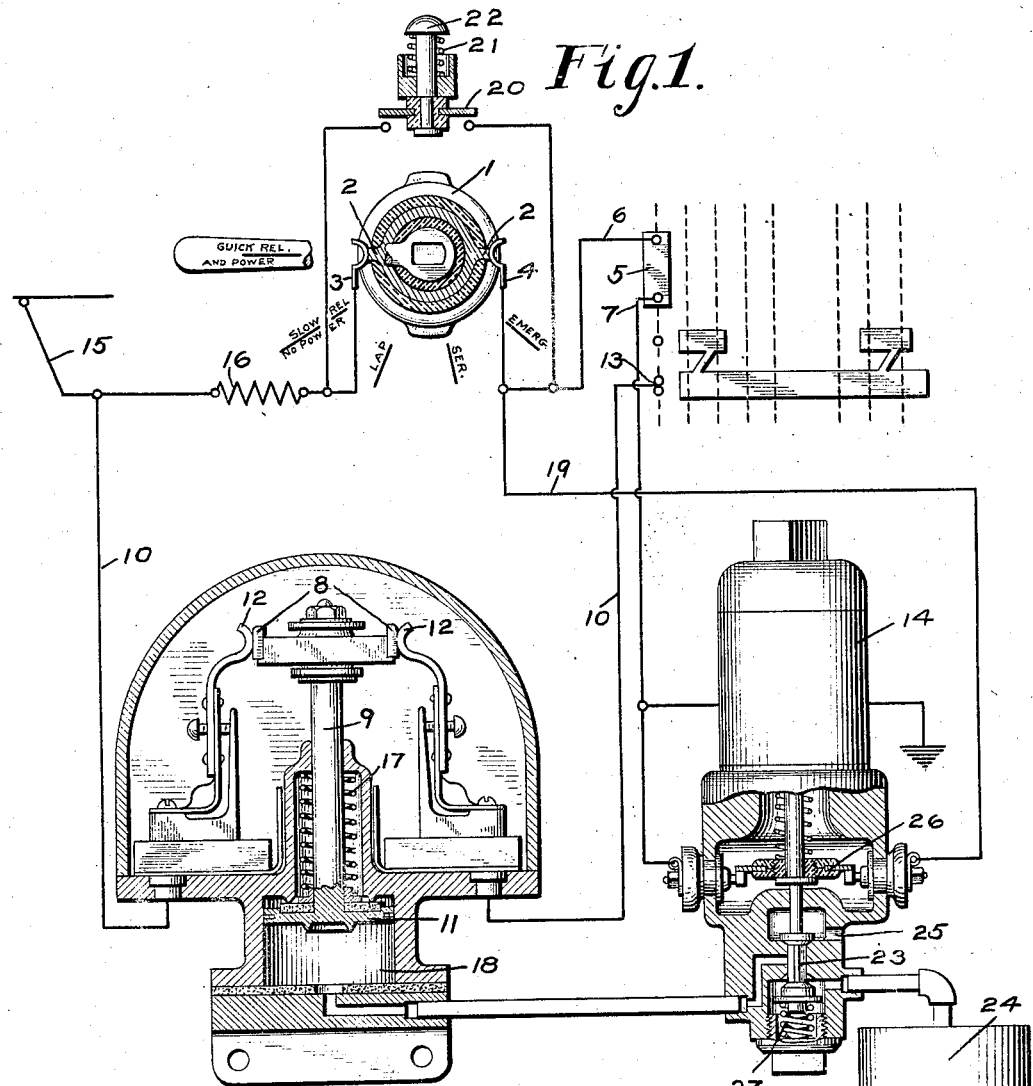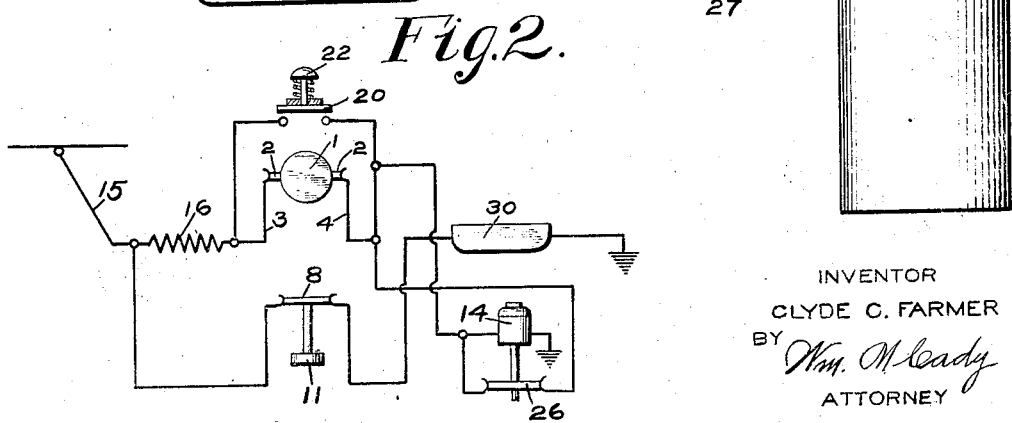

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR DEVICE.

1,378,406.     Specification of Letters Patent.     Patented May 17, 1921.

Application filed March 26, 1920. Serial No. 368,909.

*To all whom it may concern:*

Be it known that I, CLYDE C. FARMER, a citizen of the United States, residing at Edgewood, in the county of Allegheny and State of Pennsylvania, have invented new and useful Improvements in Safety Car Devices, of which the following is a specification.

This invention relates to car brake and power controlling devices adapted more particularly for electric traction cars.

It sometimes happens that power will fail by the trolley wheel leaving the trolley wire while the car is running. In order to stop the car so as to replace the trolley wheel on the trolley wire, the motorman will apply the brakes, but he may neglect to return the controller handle to off position before leaving the car.

When the motorman replaces the trolley wheel on the trolley wire, current will be supplied to the car motors, since the controller has been left in a power position, and if the power of the motors should exceed the holding power of the brakes the car will start off without the motorman.

The principal object of my invention is to provide means for overcoming the above difficulty.

In the accompanying drawing; Figure 1 is a diagrammatic view of a car brake and power controlling apparatus embodying my invention; Fig. 2 a diagrammatic view illustrating an application of certain features of my invention where an automatic controller of the H. L. type is employed.

In Fig. 1 of the drawing, the reference numeral 1 indicates a brake valve device having a valve for controlling ports for applying and releasing the brakes in the usual manner and said brake valve is provided with connected contacts 2 adapted in one position of the brake valve to complete a circuit through fingers 3 and 4.

A development of a portion of the usual hand operated controller is shown in which an additional contact bar 5 is provided, which in the off position of the controller is adapted to close a circuit through wires 6 and 7.

The power circuit to the controller is controlled by a switch device, comprising connected contacts 8, carried by piston stem 9 of a piston 11, and adapted to connect contact fingers 12 for completing a circuit from the trolley 15, through wire 10, to power contact 13 of the controller.

The piston 11 is moved in one direction by a spring 17 and in the opposite direction by fluid under pressure supplied to the piston chamber 18.

The admission and release of fluid under pressure to and from the piston chamber 18 is controlled by a double beat valve 23 adapted in one position to supply fluid from a reservoir 24 to said piston chamber and in the opposite position to connect said chamber with an exhaust port 25.

The double beat valve 23 is controlled by a magnet 14, having one circuit connected through wire 7 with a contact in the controller and another circuit through a switch 26 and a wire 19 connected to contact finger 4 at the brake valve.

The brake valve device may have the positions of quick release, slow release, lap, service, and emergency application, and preferably, the contacts 2 are arranged to close the circuit through the fingers 3 and 4 in the quick release position of the brake valve.

In operation, if the brake valve is in its quick release position and the power controller in its off position, the magnet 14 will be energized through the circuit controlled by the contact bar 5 in the controller and the switch 26 will be moved to its closed position by the magnet 14.

The double beat valve 23 is also moved to the position shown in the drawing, in which fluid under pressure is supplied from the reservoir 24 to the piston chamber 18 so that piston 11 operates the contacts 8 to close the circuit through contact fingers 12. Current is then supplied to the controller through wire 10 to the power contact 13, so that the controller may be operated to supply current to the car motors in the usual manner.

In this position, a circuit for energizing the magnet 14 is also closed through the switch 26 and wire 19, so that the controller may now be moved to its various power positions without deënergizing the magnet 14, so long as the brake valve remains in power position.

If the trolley wheel should leave the trolley wire, the magnet 14 will at once be deënergized and the double beat valve 23 will be shifted by spring 27 to its upper position, in which fluid under pressure is vented from piston chamber 18, permitting the spring 17 to shift the piston and the contacts 8, so as to open the power circuit at the contact fingers 12.

If the trolley wheel is now replaced on the trolley wire, no current will be supplied to the car motors, even though the controller has been left in a power on position.

When the operator returns to the car, before he can obtain power, he must move the controller to off position, so as to close the circuit of the magnet 14 through the contact bar 5 of the controller, and the brake valve must also be in power position, closing the circuit through the contact fingers 3 and 4.

It will be noted that since the circuit of the magnet 14 is completed through contacts controlled by the brake valve, any movement of the brake valve from the power position will effect the opening of the power circuit.

In order that power may be available, in case of necessity, when the brake valve is moved to another position, as for example when power is required for operating track switches, and the brakes are to be applied, a local circuit may be provided around the brake valve contacts which may be manually held closed by a switch 20. Said switch is normally held open by a spring 21 and is adapted to be closed by pressing a push button 22.

With a controller of the automatic type, such as the H. L. controller, where the closing of the power circuit causes the controller to operate automatically to supply current to the car motors and the opening of the power circuit causes the controller parts to return to off position, the circuit connections from the magnet 14 to contacts in the controller are not employed, the arrangement of the switches, however, being substantially the same, as shown in Fig. 2 of the drawing.

In this case, when power is lost by the trolley leaving the trolley wire, the magnet 14 will be deënergized so as to effect the opening of the switch 8 and the trolley circuit to the controller 30, as described in connection with the apparatus shown in Fig. 1.

When the operator replaces the trolley wheel, the magnet 14 will not be energized to effect the closure of the switch 8, since the magnet circuit is open at the switch 26. When the operator returns to the car, he must press the button 22, so as to close an auxiliary circuit to the magnet 14. When the magnet 14 is energized, the switch 26 will be closed and the operator may then release the button 22, since the magnet circuit will now be maintained through the contacts controlled by the brake valve 1, so long as the brake valve is maintained in the power on position.

Having now described my invention, what I claim as new and desire to secure by Letters Patent, is:

1. In a car brake and power controlling apparatus, the combination with a power controller, of a switch device for controlling the power circuit of the controller, electrically controlled means for controlling the operation of said switch, and a brake valve device for controlling the circuit of said means.

2. In a car brake and power controlling apparatus, the combination with a power controller, of a switch device for controlling the power circuit of the controller, a magnet device adapted upon deënergization to effect the opening of said switch, and a brake valve device having a position for closing the circuit of said magnet.

3. In a car brake and power controlling apparatus, the combination with a power controller, of a switch device for controlling the power circuit of the controller, a magnet device adapted upon deënergization to effect the opening of said switch, a brake valve device having a position for closing the circuit of said magnet, and a switch controlled by said magnet for also controlling the magnet circuit.

4. In a car brake and power controlling apparatus, the combination with a power controller, of a switch device for controlling the power circuit of said controller, a magnet device for controlling the operation of said switch device, a brake valve device for controlling the circuit of said magnet device, and means for closing the circuit of said magnet device in the off position of the controller.

5. In a car brake and power controlling apparatus, the combination with a power controller, of magnet controlled means for controlling the power circuit of said controller and means for closing the circuit of the magnet in the off position of the controller.

6. In a car brake and power controlling apparatus, the combination with a power controller, of magnet controlled means for controlling the power circuit of said controller, a brake valve device for controlling the circuit of the magnet, said circuit being also closed by the movement of the controller to off position.

7. In a car brake and power controlling apparatus, the combination with a power controller, of a switch device for controlling the power circuit of the controller, a magnet adapted upon energization for effecting the closure of said switch, a brake valve device for controlling the circuit of said magnet, and means for closing the magnet circuit in the off position of the controller.

8. In a car brake and power controlling apparatus, the combination with a power controller, of a switch device for controlling the power circuit of the controller, a magnet adapted upon energization for effecting the closure of said switch, a brake valve device having contacts for controlling a circuit of the magnet, a switch operated upon energization of said magnet for closing said circuit, and means controlled by the movement of said controller to off position, for closing a circuit through said magnet.

9. In a car brake and power controlling apparatus, the combination with a power controller, of a switch device for controlling the power circuit of the controller, a magnet adapted upon energization for effecting the closure of said switch, a brake valve device having contacts for controlling a circuit through said magnet and a normally open switch adapted to be manually operated for closing the magnet circuit independently of the position of the brake valve device.

In testimony whereof I have hereunto set my hand.

CLYDE C. FARMER.